US008236462B2

(12) United States Patent
Ueno et al.

(10) Patent No.: US 8,236,462 B2
(45) Date of Patent: Aug. 7, 2012

(54) ELECTRODE CATALYST FOR FUEL CELL, METHOD FOR PRODUCING THE ELECTRODE CATALYST, AND POLYMER ELECTROLYTE FUEL CELL USING THE ELECTRODE CATALYST

(75) Inventors: Yukiyoshi Ueno, Gotenba (JP); Tetsuo Nagami, Nagoya (JP); Tetsuya Shoji, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 268 days.

(21) Appl. No.: 12/672,079

(22) PCT Filed: Jan. 26, 2009

(86) PCT No.: PCT/JP2009/051188
§ 371 (c)(1),
(2), (4) Date: Feb. 4, 2010

(87) PCT Pub. No.: WO2009/096356
PCT Pub. Date: Aug. 6, 2009

(65) Prior Publication Data
US 2011/0081595 A1     Apr. 7, 2011

(30) Foreign Application Priority Data
Jan. 28, 2008  (JP) ................................. 2008-015952

(51) Int. Cl.
*H01M 4/88* (2006.01)
*H01M 4/92* (2006.01)
*H01M 8/10* (2006.01)

(52) U.S. Cl. ........ 429/485; 429/487; 429/523; 429/524; 429/525; 429/526

(58) Field of Classification Search .................. 429/485, 429/487, 523, 524, 525, 526
See application file for complete search history.

(56) References Cited

U.S. PATENT DOCUMENTS

| 2003/0175569 A1 | 9/2003 | Inagaki et al. |
| 2005/0075240 A1 | 4/2005 | Yamamoto |
| 2006/0093892 A1 | 5/2006 | Min et al. |
| 2011/0081595 A1* | 4/2011 | Ueno et al. .................... 429/482 |

FOREIGN PATENT DOCUMENTS

| EP | 1 524 711 | 4/2005 |
| EP | 1 653 535 | 5/2006 |
| EP | 1 947 718 A1 | 7/2008 |
| EP | 1 947 719 A1 | 7/2008 |
| JP | 63-12349 | 1/1988 |
| JP | 2002-15744 | 1/2002 |
| JP | 2002-289208 | 10/2002 |
| JP | 2003-263999 | 9/2003 |
| JP | 2005-100713 | 4/2005 |
| JP | 2005-135900 | 5/2005 |
| JP | 2005-196972 | 7/2005 |
| JP | 2006-128117 | 5/2006 |
| WO | WO 2007/043441 A1 | 4/2007 |
| WO | WO 2007/055229 A1 | 5/2007 |
| WO | WO 2008/025750 | 3/2008 |

OTHER PUBLICATIONS

H. Yano et al., "Oxygen Reduction Activity of Carbon-Supported PT-M (M=V, Ni, Cr, Co, and Fe) Alloys Prepared by Nanocapsule Method," Langmuir, The ACS Journal of Surfaces and Colloids, vol. 23, No. 11, pp. 6438-6445 (2007).
M. Yashima et al., "Structure and Catalytic Properties of Nanosized Alumina Supported Platinum and Palladium Particles Synthesized by Reaction in Microemulsion," Journal of Colloid and Interface Science, vol. 268, pp. 348-356 (2003).
N. Sobal et al., "Synthesis of Core-Shell PtCo Nanocrystals," J. Phys. Chem. B, vol. 107, pp. 7351-7354 (2003).
Do, J. et al., "Effect of thermal annealing on the properties of $Co_{rich\ core}$-$Pt_{rich\ shell}$/C oxygen reduction electrocatalyst," Journal of Power Sources, vol. 172, (2007), pp. 623-632.
Zhang, J., "Platinum Monolayer on Nonnoble Metal-Noble Metal Core-Shell Nanoparticle Electrocatalysts for $O_2$ Reduction," The Journal of Physical Chemistry B, vol. 109, No. 48, (2005), pp. 22701-22704.
Mani, P., "Dealloyed-Pt-Cu Core-Shell Nanoparticle electrocatalysts for Use in PEM Fuel Cell Cathodes," J. Phys. Chem. C, vol. 112, No. 7 (2008), pp. 2770-2778.
Extended European Search Report for EP Appl. No. 09705680.8 dated May 18, 2012.

* cited by examiner

*Primary Examiner* — Timothy Vanoy
(74) *Attorney, Agent, or Firm* — Finnegan, Henderson, Farabow, Garrett & Dunner, LLP

(57) ABSTRACT

An electrode catalyst for a fuel cell, which has improved performance compared with conventional platinum alloy catalysts, a method for producing the electrode catalyst, and a polymer electrolyte fuel cell using the electrode catalyst are provided. The electrode catalyst for a fuel cell comprises a noble-metal-non-precious metal alloy that has a core-shell structure supported on a conductive carrier. The composition of the catalyst components of the shell is such that the amount of the noble metal is greater than or equal to the amount of the non-precious metal.

18 Claims, 4 Drawing Sheets

| Element | Counts | K-Rel x,Si | K-Std x,Si | Wt % | Atom % |
|---|---|---|---|---|---|
| Fe-K | | 332 | 1.061 | --- 18.08 | 43.53 |
| Pt-M | | 1004 | 1.590 | --- 81.92 | 56.47 |
| Total | | | | 100.00 | 100.00 |

Accelerating Voltage: 200 KeV
Take Off Angle: 25°
Live Time:           80 seconds
Dead Time:    8.355

ELECTRODE CATALYST FOR FUEL CELL, METHOD FOR PRODUCING THE ELECTRODE CATALYST, AND POLYMER ELECTROLYTE FUEL CELL USING THE ELECTRODE CATALYST

CROSS-REFERENCE TO RELATED APPLICATIONS

This application is a national phase application of International Application No. PCT/JP2009/051188, filed Jan. 26, 2009, and claims the priority of Japanese Application No. 2008-015952, filed Jan. 28, 2008, the contents of both of which are incorporated herein by reference.

TECHNICAL FIELD

The present invention relates to an electrode catalyst for a fuel cell, which has improved performance compared with conventional platinum alloy catalysts, a method for producing the electrode catalyst, and a polymer electrolyte fuel cell using the electrode catalyst.

BACKGROUND ART

In fuel cells, water is produced by a cell reaction as a product in principle. Fuel cells have therefore drawn attention as clean power generation systems without a substantially harmful influence on the earth's environment. For example, a polymer electrolyte fuel cell comprising a pair of electrodes on both sides of a polymer electrolyte membrane that conducts protons produces electromotive force by supplying hydrogen gas as a fuel gas to one of the electrodes (i.e., the fuel electrode: anode), and supplying oxygen gas or air as an oxidant to the other electrode (i.e., the air electrode: cathode).

The cell characteristics of polymer electrolyte fuel cells have been drastically improved by advances such as the following: (1) a polymer electrolyte membrane having high ion conductivity has been developed; and (2) catalyst-supported carbon coated with the polymer electrolyte consisting of a material that is the same as or different from that of the polymer electrolyte membrane is used as the constituent material of the electrode catalyst layer to form what is called a three-dimensional reaction site in the catalyst layer. In addition to the excellent cell characteristics described above, the polymer electrolyte fuel cell can readily be made smaller and lighter. Due to the characteristics described above, the polymer electrolyte fuel cell is expected to be put in practical use as a power source for mobile vehicles such as electrically powered cars or power sources for small cogeneration systems.

In general, the gas diffusion electrode used in a polymer electrolyte fuel cell consists of a catalyst layer, which contains catalyst-supported carbon materials coated with the polymer electrolyte, and a gas diffusion layer, which not only supplies the reaction gas to the catalyst layer but also collects electrons. The catalyst layer has open areas consisting of micropores formed among secondary or tertiary carbon particles, which are constituents of the catalyst layer, and the open areas function as diffusion channels of the reaction gas. As such catalysts, noble metal catalysts, such as platinum or a platinum alloy, that are stable in a polymer electrolyte are generally used.

In the past, a polymer electrolyte fuel cell involved the use of catalysts comprising a noble metal, such as platinum or platinum alloy, supported on carbon black as cathode and anode catalysts of the electrode catalysts. In general, platinum-supported carbon black is prepared by adding sodium bisulfite to an aqueous solution of platinic chloride, allowing the mixture to react with a hydrogen peroxide solution, preparing the carbon black particles to support the resulting platinum colloids, washing the resultants, and heating the resultants as needed. Electrodes of a polymer electrolyte fuel cell are prepared by dispersing platinum-supported carbon black particles in a polymer electrolyte solution to prepare an ink, coating the gas diffusion substrate, such as a carbon paper, with the ink, and drying the substrate. The polymer electrolyte membrane is sandwiched between such two electrodes, followed by a hot press. Thus, an electrolyte membrane-electrode assembly (MEA) can be constructed.

Platinum is an expensive noble metal, and it is thus expected to exhibit satisfactory performance by a small amount thereof. Accordingly, work is proceeding with catalyst activity in smaller amounts of platinum. For example, JP Patent Publication (kokai) No. 2002-289208 A is intended to provide an electrode catalyst for a fuel cell having high durability by inhibiting growth of platinum particles during operation, and discloses an electrode catalyst comprising a conductive carbon material, metal particles supported thereon that are less likely to be oxidized than platinum under acidic conditions, and platinum covering the outer surface of the metal particles. Specifically, the publication exemplifies an alloy comprising platinum and at least one metal selected from among gold, chromium, iron, nickel, cobalt, titanium, vanadium, copper, and manganese as the metal particle.

JP Patent Publication (kokai) No. 2002-15744 A is intended to provide a polymer fuel cell that has excellent cathode polarization properties and produces a high cell output, and disclose the catalyst layer of the cathode containing a metal catalyst selected from the group consisting of platinum and platinum alloy and a metal complex containing a given amount of iron or chromium to improve cathode polarization properties. Specifically, a polymer electrolyte fuel cell comprises an anode, a cathode, and a polymer electrolyte membrane located between the anode and the cathode, wherein the cathode comprises a gas diffusion layer and a catalyst layer located between the gas diffusion layer and the polymer electrolyte layer, the catalyst layer contains a noble metal catalyst selected from the group consisting of platinum and platinum alloy and a metal complex containing iron or chromium, and the content of the metal complex is 1 to 40 mol % of the combined quantity of the metal complex and the noble metal catalyst.

Moreover, JP Patent Publication (Kokai) No. 63-12349 A (1988) discloses obtainment of a platinum alloy catalyst by causing a carrier to support platinum thereon, adhering a metal compound for alloy formation to the carrier, reducing the metal compound, and then performing heat treatment for alloy formation.

Meanwhile, JP Patent Publication (Kokai) No. 2005-135900 A discloses an electrode catalyst for a fuel cell having a core-shell structure, in which both the core and the shell contain platinum.

DISCLOSURE OF THE INVENTION

Problems to be Solved by the Invention

Catalysts according to the above patent documents (JP Patent Publication (kokai) No. 2002-289208 A; JP Patent Publication (kokai) No. 2002-15744 A; and JP Patent Publication (Kokai) No. 63-12349 A (1988)) exhibit insufficient performance for four-electron reduction. Hence, development of a sophisticated catalyst has been desired. Also, the catalyst according to JP Patent Publication (Kokai) No. 2005-135900 A exhibits low activity in spite of the large amount of platinum it uses and shows poor cost performance.

Therefore, an object of the present invention is to provide a more sophisticated electrode catalyst for a fuel cell, compared with conventional platinum alloy catalysts, a method for producing the electrode catalyst, and a polymer electrolyte fuel cell using the electrode catalyst.

Means to Achieve the Objects

The present inventors have discovered that the above problems can be solved using a specific amount of an alloy catalyst component of a catalyst having a core-shell structure. Thus, the present inventors have achieved the present invention.

Specifically, first, the present invention relates to an electrode catalyst for a fuel cell, comprising a noble-metal-non-precious metal alloy with a core-shell structure supported on a conductive carrier. The present invention is characterized in that the composition of the catalyst component of the shell is such that the amount of the noble metal is greater than or equal to the amount of the non-precious metal. The electrode catalyst for a fuel cell of the present invention can reduce the overall noble metal amount and is excellent in cost performance.

A typical example of the electrode catalyst for a fuel cell of the present invention is preferably an electrode catalyst wherein the core part comprises a noble-metal-non-precious metal alloy and the shell part comprises a noble metal.

For the present invention, various known metals can be used in combination as noble metals and non-precious metals. A preferable example thereof is a noble-metal-non-precious metal alloy combination of a noble metal that is platinum and a non-precious metal that is one or more types of metal selected from the group consisting of ruthenium (Ru), molybdenum (Mo), osmium (Os), cobalt (Co), rhodium (Rh), iridium (Ir), iron (Fe), nickel (Ni), titanium (Ti), tungsten (W), palladium (Pd), rhenium (Re), chromium (Cr), manganese (Mn), niobium (Nb), and tantalum (Ta).

Second, the present invention relates to a method for producing an electrode catalyst for a fuel cell, which comprises a noble-metal-non-precious metal alloy having a core-shell structure supported on a conductive carrier, wherein the composition of the catalyst component of the shell is such that the amount of the noble metal is greater than or equal to the amount of the non-precious metal. The method comprises dissolving a noble metal component, a non-precious metal component, and polyol in a solvent, adding amine to the solution, adding a conductive carrier and acetone after reflux, causing the conductive carrier to support the catalyst component thereon while removing protective colloids formed during the polyol reduction reaction, washing and drying the resultant, and then performing heat treatment under a reducing atmosphere.

According to the method for producing an electrode catalyst for a fuel cell of the present invention, catalyst preparation proceeds using polyol reduction reaction while removing protective colloids formed during the polyol reduction reaction. Hence, a catalyst having the above specific structure and specific components can be efficiently produced. Also, platinum is precipitated on the uppermost surface of particles by heat treatment under a reducing atmosphere, making it possible to form a core-shell structure and produce a highly active catalyst. Meanwhile, the average composition ratio of the obtained catalyst can be, for example, noble metal:non-precious metal=50:50 to 89:11, and particularly 51:49 to 57:43. The overall amount of the noble metal used can be further reduced compared with conventional cases.

A preferable example of the method for producing an electrode catalyst for a fuel cell of the present invention is, more specifically, a case wherein the noble metal component is platinum acetyl acetate, the non-precious metal component is non-precious metal acetyl acetate, and the conductive carrier is a carbon carrier.

Temperature for heat treatment under the reducing atmosphere preferably ranges from 300° C. to 500° C. and is more preferably around 400° C.

Third, the present invention relates to a polymer electrolyte fuel cell that comprises the above electrode catalyst for a fuel cell.

Effect of the Invention

The electrode catalyst for a fuel cell of the present invention is highly active, although the proportion of the amount of the noble metal used is more reduced than in the case of conventional catalysts for a fuel cell. That is, the activity of per weight of platinum in the case of the electrode catalyst of the present invention is higher than the case of conventional platinum catalysts or platinum-iron alloy catalysts.

This description includes part or all of the contents as disclosed in the description and/or drawings of Japanese Patent Application No. 2008-015952, which is a priority document of the present application.

BEST MODE FOR CARRYING OUT THE INVENTION

Figure 1:
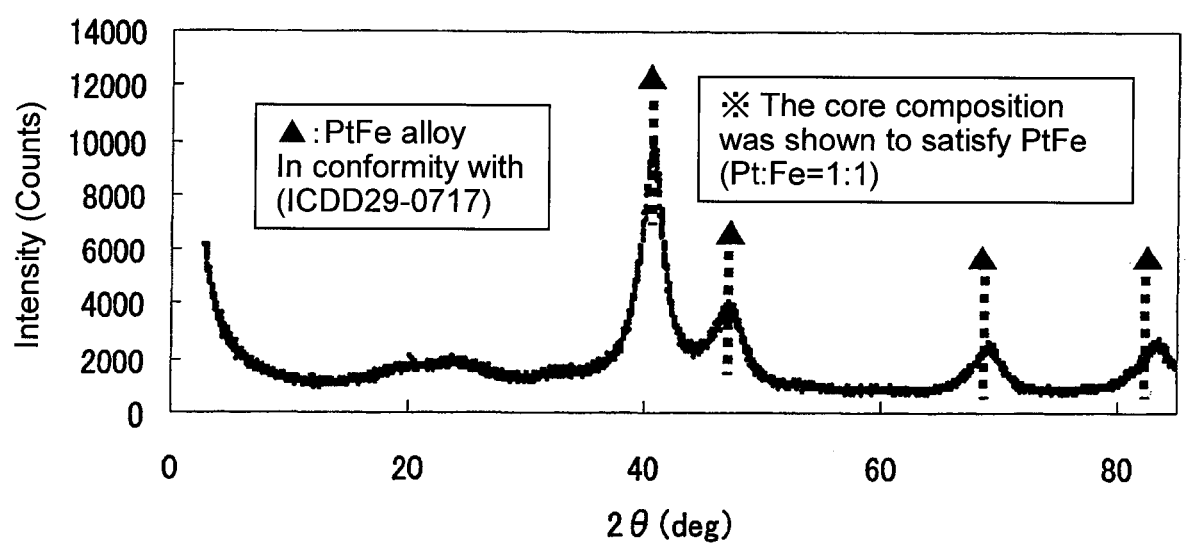
FIG. 1 shows the composition of the catalyst core in the Example, as evaluated by ERD analysis.

Hereafter, the present invention is described in greater detail with reference to the following example and comparative examples.

EXAMPLE

Preparation of PtFe/C Catalyst

A PtFe/C catalyst was prepared by the following procedures.

(Selection of Composition)

The composition ratio is selected so that the amount of platinum is great based on the stable structures of alloys, which are represented by the phase diagram between metals. Specifically, as in the phase diagram of a PtFe alloy, stable structures are Fe3Pt (wherein the amount of Pt accounts for 25%), PtFe (wherein the amount of Pt accounts for 50%), and Pt3Fe (wherein the amount of Pt accounts for 75%). A composition ratio is selected, so that the amount of platinum in the composition is greater than that in these stable structures. For example, in the case of a Pt—Fe alloy catalyst, the average Pt percentage in the alloy ranges from 25% to 33%, 50% to 56%, and 75% to 99%.

(Synthesis Method)
1) Always perform the reaction under an Ar atmosphere.
2) Dissolve 197 mg of Pt(acac)$_2$, 139 mg of Fe(acac)$_3$, and 390 mg of 1,2-Hexadecanediol in 20 ml of octyl-ether. In addition, the term "acac" refers to acetyl acetate.
3) Maintain the solution at 100° C. for 30 minutes while stirring it with a magnetic stirrer.
4) Add 0.16 ml of oleic acid and 0.17 ml of oleyl amine into the system.
5) Perform reflux at 290° C. for 30 minutes while stirring the solution.
6) Stop stirring and then allow the solution to naturally cool to room temperature.
7) Add 100 mL of hexane to the solution in which particles are dispersed.
8) Add 120 mg of carbon.
9) Add approximately 50 mL of acetone while stirring the solution and then dissolve polyamide (condensate of oleic acid and oleyl amine) in the form of protective colloids therein.
10) Filter the resultant, followed by washing with ethanol→pure water.
11) Perform vacuum drying at 90° C.

(Heat Treatment)
The thus obtained PtFe/C catalyst powder was subjected to heat treatment at 400° C. under a hydrogen atmosphere.

Comparative Example 1

Preparation of PtFe/C Catalyst

A conventional PtFe/C catalyst was prepared by the following procedure.
1) Disperse 2.0 g of carbon (Ketjen, trade name) in 0.2 L of pure water, preparing a slurry.
2) Add dropwise 33 g (containing 1.6 g of platinum) of a 5 wt % aqueous hexahydroxoplatinum nitrate solution while stirring the slurry.
3) Stir the above mixture.
4) Add dropwise 1 L of pure water to the thus obtained mixture and then filter the solution after mixing.
5) After filtration, further wash the thus obtained cake with pure water.
6) After washing, disperse the thus obtained cake in 1 L of pure water.
7) Dissolve 1.5 g (containing 0.16 g of Fe) of iron nitrate in 40 g of pure water.
8) Add dropwise the aqueous iron nitrate solution of (7) to the mixture of (6).
9) Add dropwise a 0.01N ammonia solution to the thus obtained mixture to PH 9.0.
10) Add dropwise 1 L of pure water to the thus obtained mixture, followed by filtration.
11) After filtration, further wash the thus obtained cake with pure water.
12) After washing, heat and dry the thus obtained cake in a vacuum at 100° C. for 24 hours.
13) Heat the dried powder at 700° C. for 2 hours under a hydrogen atmosphere.
14) Further perform heat treatment at 800° C. for 5 hours under an argon atmosphere.

Comparative Example 2

Preparation of Pt/C Catalyst

A conventional Pt/C catalyst was prepared by the following procedure.
1) Disperse 2.0 g of carbon (trade name: Ketjen) in 0.2 L of pure water, preparing a slurry.
2) Add dropwise 33 g (containing 1.6 g of platinum) of a 5 wt % aqueous hexahydroxoplatinum nitrate solution while stirring the slurry.
3) Stir the above mixture.
4) Add dropwise 1 L of pure water to the thus obtained mixture. Filter the solution after mixing.
5) After filtration, further wash the thus obtained cake with pure water.
6) After washing, disperse the thus obtained cake in 1 L of pure water.
7) Add dropwise a 0.01 N ammonia solution to the thus obtained mixture to PH 9.0.
8) Furthermore, add dropwise 140 mL of a 3 wt % aqueous sodium borohydride solution to the mixture.
9) Sufficiently stir the mixture.
10) Filter the thus obtained mixture.
11) After filtration, further wash the thus obtained cake with pure water.
12) After washing, heat and dry the thus obtained cake at 80° C. for 48 hours.

[Structural Analysis]
Structural analysis was carried out for the above catalyst materials using XRD, XPS, and TEM-EDX.

FIG. 1 shows the composition of the catalyst core resulting from the Example, as evaluated by ERD analysis. As shown in the result in FIG. 1, the composition of the catalyst core of the Example satisfied the condition of Pt:Fe=1:1.

Figure 2:
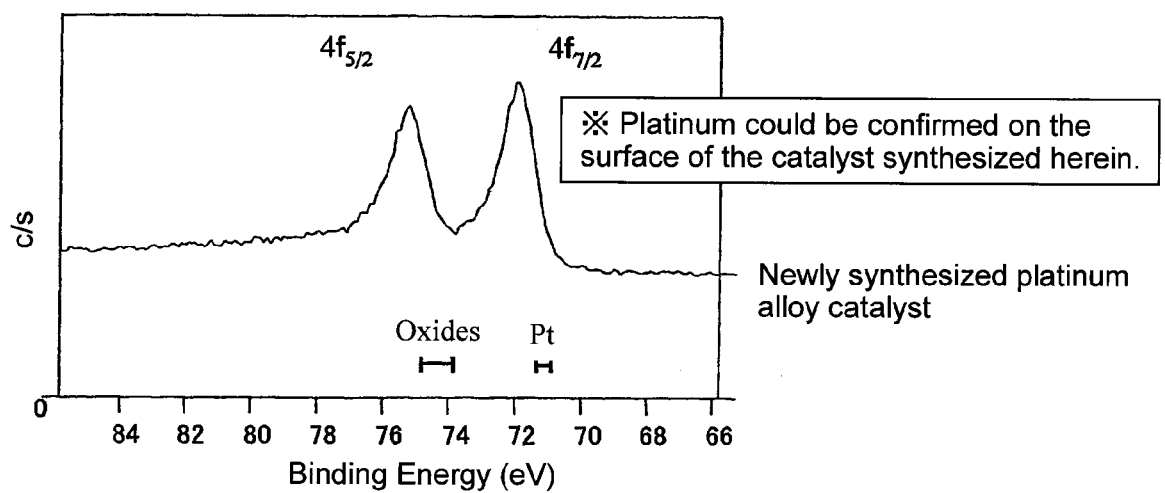
FIG. 2 shows the state of Pt4f as analyzed by XPS analysis. The results in FIG. 2 show that the catalyst surface in the Example is rich in platinum.

FIG. 2 shows the state of Pt4f as analyzed by XPS analysis. As shown in the result in FIG. 2, the catalyst surface of the Example was rich in platinum.

Figure 3:
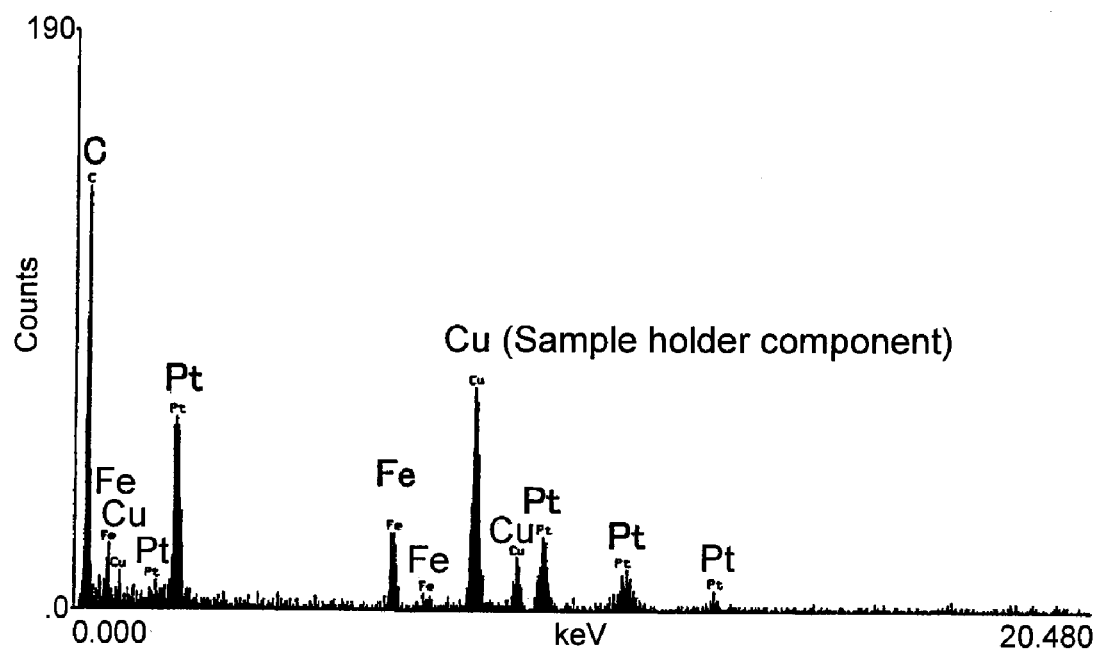
FIG. 3 shows the result of TEM-EDX analysis for the catalyst of the Example.

FIG. 3 shows the result of TEM-EDX analysis for the catalyst of the Example. As shown in the result in FIG. 3, the composition ratio of the catalyst of the Example was Pt:Fe=56.47:43.53. In addition, in FIG. 3, "K" of "Fe—K" and "M" of "Pt-M" denote the K-shell and the M-shell, respectively.

Accordingly, it was inferred that the catalyst resulting from the Example had a structure comprising a core portion of a platinum-iron alloy and a platinum-rich shell portion.

Figure 4:
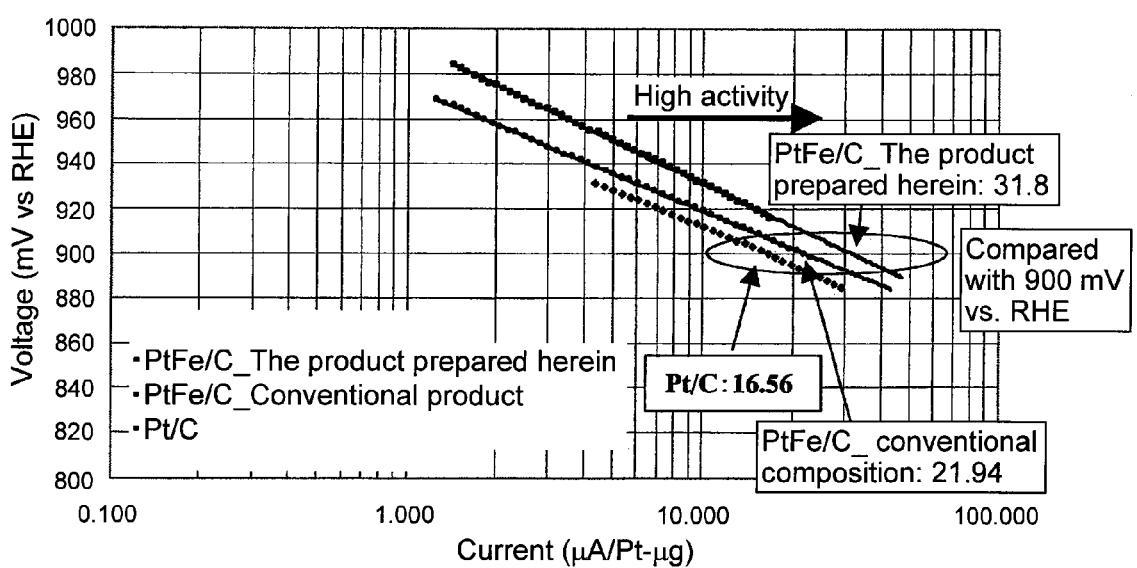
FIG. 4 shows the result of evaluating oxygen reduction performance with a rotary disc electrode and a current value of 900 mV vs. RHE.

[Performance Evaluation]
FIG. 4 shows the result of evaluating oxygen reduction performance with a rotary disc electrode and a current value of 900 mV vs. RHE. As shown in the results in FIG. 4, the electrode catalyst obtained according to the present invention was more active than platinum catalysts and conventional platinum-iron alloy catalysts.

INDUSTRIAL APPLICABILITY

The electrode catalyst for a fuel cell of the present invention is highly active and useful for reduction of the amount of a noble metal used, such as expensive platinum. Therefore, the electrode catalyst of the present invention is expected as a next-generation electrode catalyst for a fuel cell.

All publications, patents, and patent applications cited herein are incorporated herein by reference in their entirety.

The invention claimed is:
1. An electrode catalyst for a fuel cell, comprising a noble-metal-iron (Fe) alloy with a core-shell structure supported on a conductive carrier, wherein the composition of the catalyst component of the shell is such that the amount of the noble metal is greater than or equal to the amount of iron; and further wherein the average composition ratio of the alloy is noble metal:iron (Fe)=51:49 to 57:43.

2. The electrode catalyst for a fuel cell according to claim 1, wherein the core part comprises a noble-metal-iron (Fe) alloy and the shell part comprises a noble metal.

3. The electrode catalyst for a fuel cell according to claim 2, wherein the noble metal is platinum.

4. The electrode catalyst for a fuel cell according to claim 1, wherein the noble metal is platinum.

5. A method for producing an electrode catalyst for a fuel cell, comprising:
   dissolving a noble metal component, a non-precious metal component, and polyol in a solvent;
   adding amine to the solution;
   adding a conductive carrier and acetone after reflux;
   causing the conductive carrier to support the catalyst component thereon while removing protective colloids formed during the polyol reduction reaction;
   washing and drying the resultant; and then
   performing heat treatment under a reducing atmosphere,
   wherein the electrode catalyst comprises a noble-metal-non-precious metal alloy having a core-shell structure supported on a conductive carrier and the composition of the catalyst component of the shell is such that the amount of the noble metal is greater than or equal to the amount of the non-precious metal.

6. The method for producing an electrode catalyst for a fuel cell according to claim 5, wherein the noble metal component is platinum acetyl acetate, the non-precious metal component is non-precious metal acetyl acetate, and the conductive carrier is a carbon carrier.

7. A polymer electrolyte fuel cell, comprising the electrode catalyst for a fuel cell according to claim 1.

8. A polymer electrolyte fuel cell, comprising the electrode catalyst for a fuel cell according to claim 2.

9. A polymer electrolyte fuel cell, comprising the electrode catalyst for a fuel cell according to claim 4.

10. A polymer electrolyte fuel cell, comprising the electrode catalyst for a fuel cell according to claim 3.

11. An electrode catalyst for a fuel cell, comprising a noble-metal-non-precious metal alloy with a core-shell structure supported on a conductive carrier, wherein the composition of the catalyst component of the shell is such that the amount of the noble metal is greater than or equal to the amount of the non-precious metal, and wherein the non-precious metal is one or more types of metal selected from the group consisting of cobalt (Co), nickel (Ni), chromium (Cr) and manganese (Mn), and further wherein the average composition ratio of the alloy is noble metal:non-precious metal=51:49 to 57:43.

12. The electrode catalyst for a fuel cell according to claim 11, wherein the core part comprises a noble-metal-non-precious metal alloy and the shell part comprises a noble metal, and wherein the non-precious metal is one or more types of metal selected from the group consisting of cobalt (Co), nickel (Ni), chromium (Cr) and manganese (Mn).

13. The electrode catalyst for a fuel cell according to claim 12, wherein the noble metal is platinum.

14. The electrode catalyst for a fuel cell according to claim 11, wherein the noble metal is platinum.

15. A polymer electrolyte fuel cell, comprising the electrode catalyst for a fuel cell according to claim 11.

16. A polymer electrolyte fuel cell, comprising the electrode catalyst for a fuel cell according to claim 12.

17. A polymer electrolyte fuel cell, comprising the electrode catalyst for a fuel cell according to claim 14.

18. A polymer electrolyte fuel cell, comprising the electrode catalyst for a fuel cell according to claim 13.

* * * * *